US012712681B2

(12) United States Patent
Zhang et al.

(10) Patent No.: US 12,712,681 B2
(45) Date of Patent: Aug. 18, 2026

(54) FINE GRANULARITY ACK/NACK FEEDBACK FOR 5G COMMUNICATION SYSTEM

(71) Applicant: Nokia Solutions and Networks Oy, Espoo (FI)

(72) Inventors: Yi Zhang, Beijing (CN); Deshan Miao, Beijing (CN); Jingyuan Sun, Beijing (CN); Keeth Saliya Jayasinghe, Piliyandala (LK)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/528,175

(22) Filed: Dec. 4, 2023

(65) Prior Publication Data

US 2024/0178948 A1 May 30, 2024

Related U.S. Application Data

(63) Continuation of application No. 16/325,060, filed as application No. PCT/CN2016/094901 on Aug. 12, 2016, now abandoned.

(51) Int. Cl.
*H04L 1/1867* (2023.01)
*H04L 1/00* (2006.01)
*H04L 5/00* (2006.01)

(52) U.S. Cl.
CPC .......... *H04L 1/1896* (2013.01); *H04L 1/0005* (2013.01); *H04L 5/0055* (2013.01)

(58) Field of Classification Search
None
See application file for complete search history.

(56) References Cited

U.S. PATENT DOCUMENTS

2017/0141903 A1* 5/2017 Xu ........................ H04L 1/0005
2018/0262377 A1* 9/2018 Liu ................... H04W 72/0413
2019/0165893 A1* 5/2019 Khosravirad ..... H03M 13/6306
2019/0181986 A1* 6/2019 Kitamura .............. H04L 1/1819

* cited by examiner

*Primary Examiner* — Saad Khawar
(74) *Attorney, Agent, or Firm* — Lippes Mathias LLP

(57) ABSTRACT

There is provided a method comprising determining a number of acknowledgment bits allocated to at least one transmit block, the at least one transmit block comprising a plurality of code blocks, allocating each of the plurality of code blocks to a respective code block group, based on the number of acknowledgment bits allocated to the at least one transmit block and the number of the plurality of code blocks, wherein each code block group is associated with one of the number of acknowledgment bits and causing transmission of the acknowledgment bit associated with each respective code block group based on a determined acknowledgement result for the respective code block group.

19 Claims, 10 Drawing Sheets

S1 — Determining a number of acknowledgment bits allocated to at least one transmit block, the at least one transmit block comprising a plurality of code blocks S2 — Allocating each of the plurality of code blocks to a respective code block group, based on the number of acknowledgment bits allocated to the at least one transmit block and the number of the plurality of code blocks, wherein each code block group is associated with one of the number of acknowledgment bits S3 — Causing transmission to a base station of the acknowledgment bit associated with each respective code block group based on a determined acknowledgement result for the respective code block group

Figure 4:
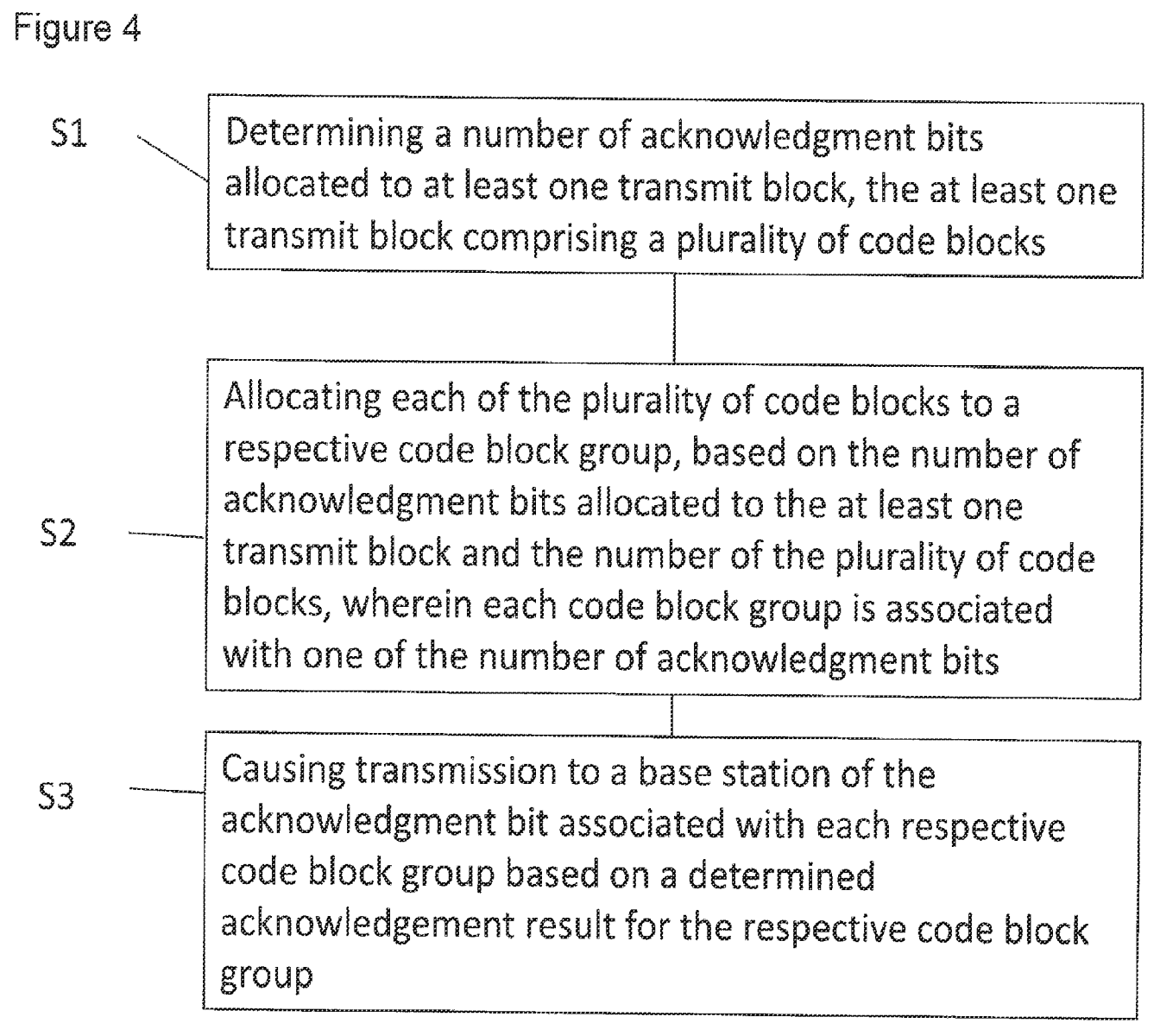

Determining a number of acknowledgment bits allocated to at least one transmit block, the at least one transmit block comprising a plurality of code blocks

S2

Allocating each of the plurality of code blocks to a respective code block group, based on the number of acknowledgment bits allocated to the at least one transmit block and the number of the plurality of code blocks, wherein each code block group is associated with one of the number of acknowledgment bits

S3

Causing transmission to a base station of the acknowledgment bit associated with each respective code block group based on a determined acknowledgement result for the respective code block group

Figure 5:
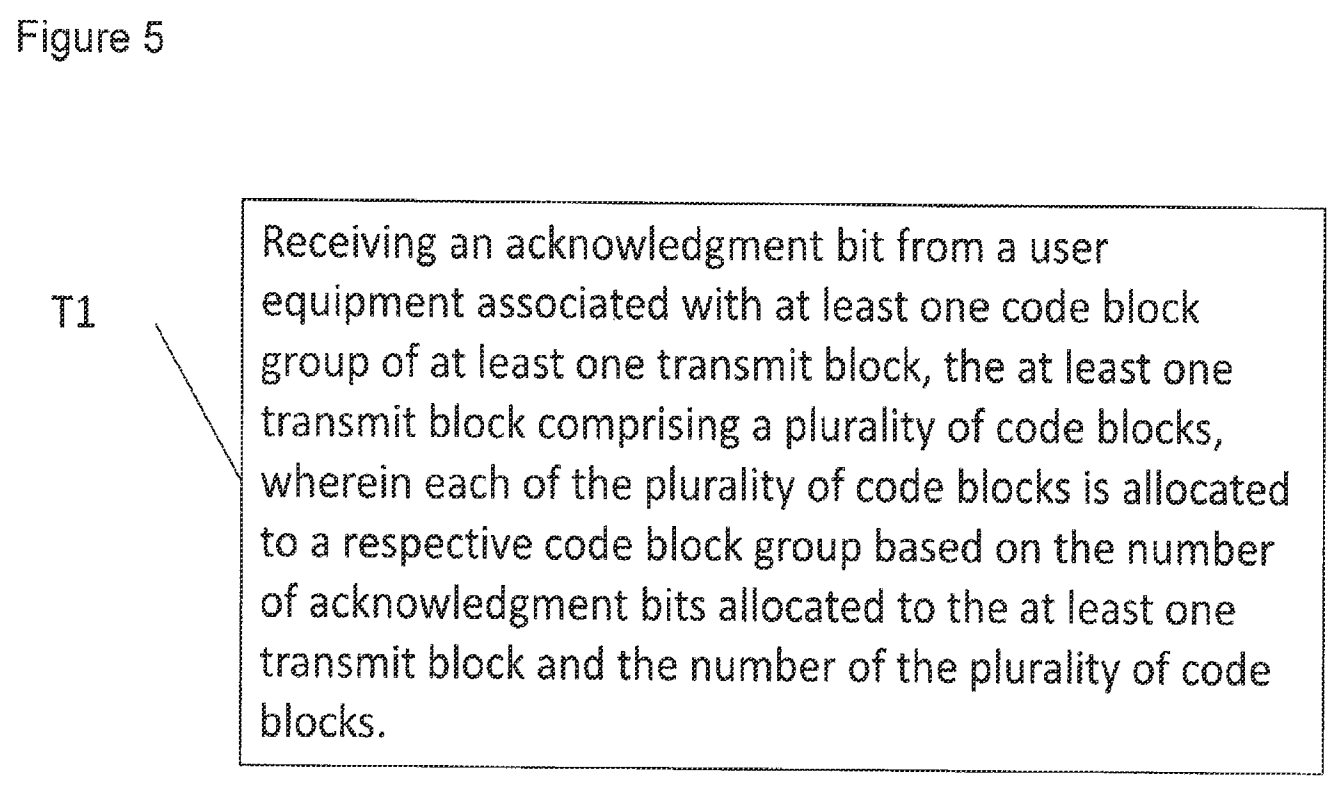

Receiving an acknowledgment bit from a user equipment associated with at least one code block group of at least one transmit block, the at least one transmit block comprising a plurality of code blocks, wherein each of the plurality of code blocks is allocated to a respective code block group based on the number of acknowledgment bits allocated to the at least one transmit block and the number of the plurality of code blocks.

Figure 7

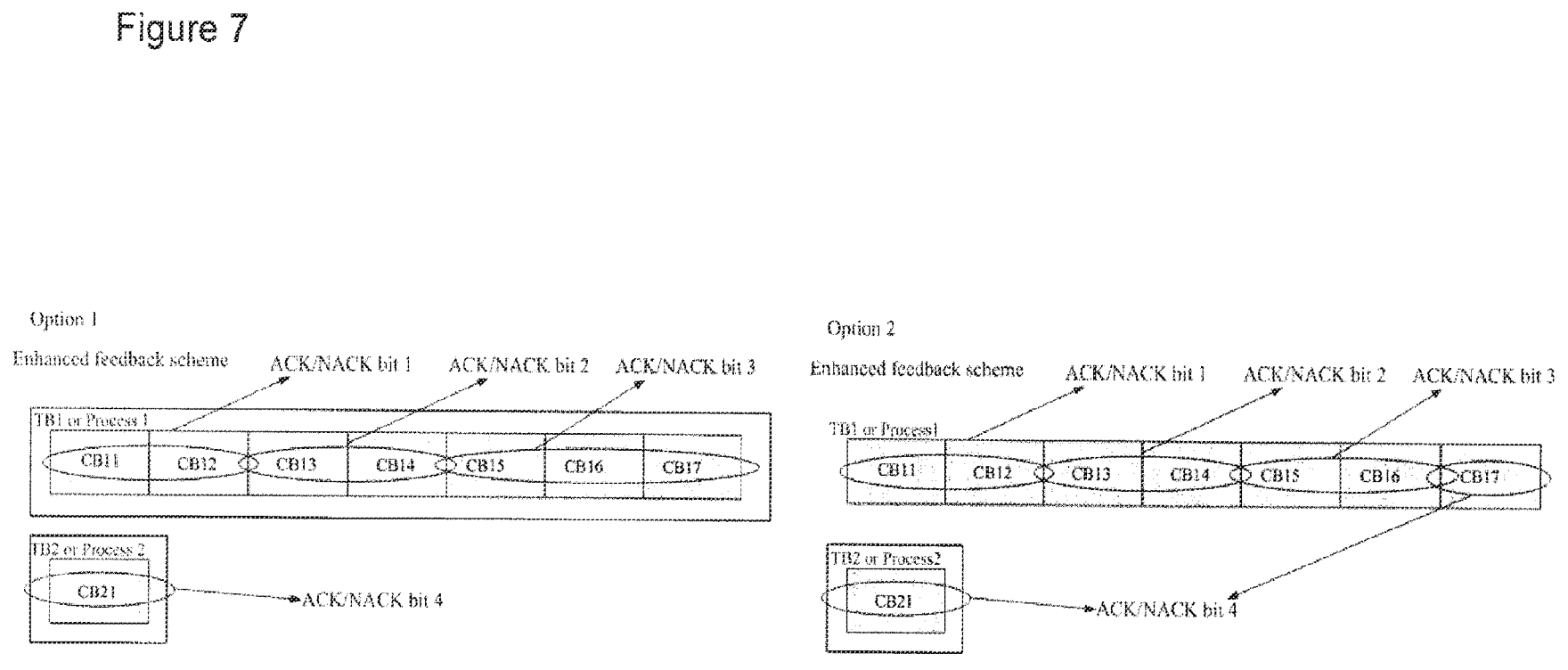

Option 1

Enhanced feedback scheme

TB1 or Process 1

CB11 CB12 CB13 CB14 CB15 CB16 CB17

ACK/NACK bit 1

ACK/NACK bit 2

ACK/NACK bit 3

TB2 or Process 2

CB21

ACK/NACK bit 4

Option 2

Enhanced feedback scheme

TB1 or Process1

CB11 CB12 CB13 CB14 CB15 CB16 CB17

ACK/NACK bit 1

ACK/NACK bit 2

ACK/NACK bit 3

TB2 or Process2

CB21

ACK/NACK bit 4

Figure 8

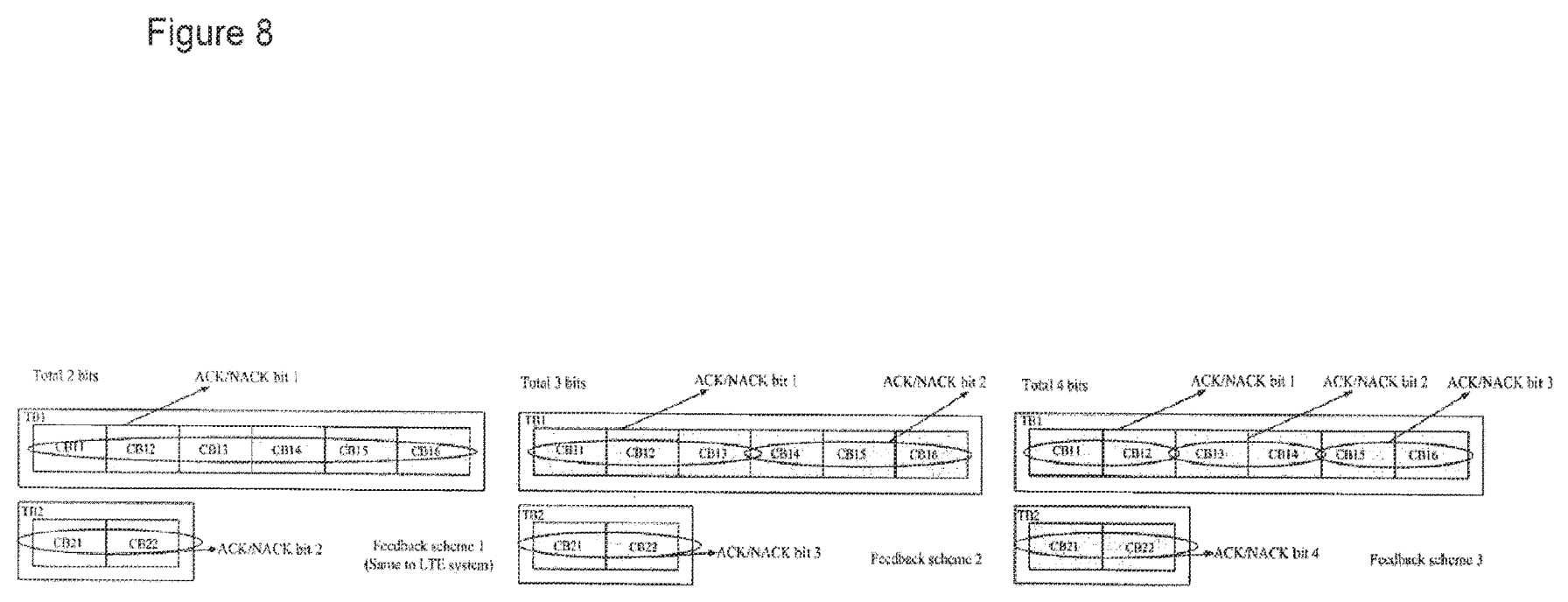

Total 2 bits

TB1

CB11 CB12 CB13 CB14 CB15 CB16

ACK/NACK bit 1

TB2

CB21 CB22

ACK/NACK bit 2

Feedback scheme 1 (Same to LTE system)

Total 3 bits

TB1

CB11 CB12 CB13 CB14 CB15 CB16

ACK/NACK bit 1

ACK/NACK bit 2

TB2

CB21 CB22

ACK/NACK bit 3

Feedback scheme 2

Total 4 bits

TB1

CB11 CB12 CB13 CB14 CB15 CB16

ACK/NACK bit 1

ACK/NACK bit 2

ACK/NACK bit 3

TB2

CB21 CB22

ACK/NACK bit 4

Feedback scheme 3

FINE GRANULARITY ACK/NACK FEEDBACK FOR 5G COMMUNICATION SYSTEM

This application is a continuation application of U.S. Ser. No. 16/325,060 which was a 371 filing of PCT/CN/2016094901 International filing date 12 Aug. 2016.

FIELD

The present application relates to a method, apparatus, system and computer program and in particular but not exclusively to Acknowledgement/Non-Acknowledgment (ACK/NACK) feedback for a 5G communication system.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) radio-access technology and so-called 5G or New Radio networks. Standardization of 5G or New Radio networks is currently under discussion. LTE is being standardized by the 3rd Generation Partnership Project (3GPP).

SUMMARY

In a first aspect, there is provided a method comprising determining a number of acknowledgment bits allocated to at least one transmit block, the at least one transmit block comprising a plurality of code blocks, allocating each of the plurality of code blocks to a respective code block group, based on the number of acknowledgment bits allocated to the at least one transmit block and the number of the plurality of code blocks, wherein each code block group is associated with one of the number of acknowledgment bits and causing transmission of the acknowledgment bit associated with each respective code block group based on a determined acknowledgement result for the respective code block group.

The method may comprise determining the number of acknowledgement bits allocated to a feedback instance, the feedback instance comprising at least one process including the at least one transmit block and allocating the acknowledgement bits to the at least one process based on transmit block size.

The method may comprise determining the number of acknowledgement bits allocated to a process, the process including the at least one transmit block and allocating the acknowledgement bits to the at least one transmit block based on transmit block size.

If the feedback instance includes a plurality of processes or the at least one process includes a plurality of transmit blocks, allocating the acknowledgment bits to the processes or transmit blocks, respectively, based on transmit block size may comprise determining a transmit block size ratio between the processes or between the transmit blocks and allocating the acknowledgement bits based on an acknowledgement bit ratio closest to the transmit block ratio.

The method may comprise determining the transmit block size based on transmission parameters.

The transmission parameters may comprise at least one of modulation coding scheme and physical resource block number.

The method may comprise receiving first information from a base station, said first information comprising an indication of the number of acknowledgment bits allocated to the feedback instance.

The method may comprise receiving switching information from the base station, the switching information comprising an indication to switch from a first feedback scheme to a second feedback scheme.

The number of code blocks in each group may be equal or the number of code blocks in each group may differ by 1.

m-r code block groups may comprise L number of code blocks and r code block groups may comprise L+1 code blocks, wherein m is the number of acknowledgment bits, L is the floor to the quotient of the number of the plurality of code blocks and the number of acknowledgement bits and r is the remainder.

The method may comprise, if the transmitted acknowledgement bit is a negative acknowledgement, receiving a retransmission of the code blocks of the code block group.

In a second aspect there is provided a method comprising receiving an acknowledgment bit from a user equipment for at least one code block group of at least one transmit block, the at least one transmit block comprising a plurality of code blocks, wherein each of the plurality of code blocks is allocated to a respective code block group based on the number of acknowledgment bits allocated to the at least one transmit block and the number of the plurality of code blocks.

The method may comprise providing first information to the user equipment, said first information comprising an indication of the number of acknowledgment bits allocated to a feedback instance, the feedback instance comprising at least one process including the at least one transmit block.

The method may comprise providing switching information to the user equipment, the switching information comprising an indication to switch from a feedback scheme to a second feedback scheme.

The number of code blocks in each group may be equal or the number of code blocks in each group may differ by 1.

m-r code block groups may comprise L number of code blocks and r code block groups may comprise L+1 code blocks, wherein m is the number of acknowledgment bits, L is the floor to the quotient of the number of the plurality of code blocks and the number of acknowledgement bits and r is the remainder.

The method may comprise, if the received acknowledgement bit is a negative acknowledgement, providing a retransmission of the code blocks of the code block group.

In a third aspect there is provided an apparatus, said apparatus comprising means for determining a number of acknowledgment bits allocated to at least one transmit block, the at least one transmit block comprising a plurality of code blocks, means for allocating each of the plurality of code blocks to a respective code block group, based on the number of acknowledgment bits allocated to the at least one transmit block and the number of the plurality of code blocks, wherein each code block group is associated with one of the number of acknowledgment bits and means for causing transmission of the acknowledgment bit associated with each respective code block group based on a determined acknowledgement result for the respective code block group.

The apparatus may comprise means for determining the number of acknowledgement bits allocated to a feedback instance, the feedback instance comprising at least one process including the at least one transmit block and means for allocating the acknowledgement bits to the at least one process based on transmit block size.

The apparatus may comprise means for determining the number of acknowledgement bits allocated to a process, the process including the at least one transmit block and means for allocating the acknowledgement bits to the at least one transmit block based on transmit block size.

If the feedback instance includes a plurality of processes or the at least one process includes a plurality of transmit blocks, means for allocating the acknowledgment bits to the processes or transmit blocks, respectively, based on transmit block size may comprise means for determining a transmit block size ratio between the processes or between the transmit blocks and means for allocating the acknowledgement bits based on an acknowledgement bit ratio closest to the transmit block ratio.

The apparatus may comprise means for determining the transmit block size based on transmission parameters.

The transmission parameters may comprise at least one of modulation coding scheme and physical resource block number.

The apparatus may comprise means for receiving first information from a base station, said first information comprising an indication of the number of acknowledgment bits allocated to the feedback instance.

The apparatus may comprise means for receiving switching information from the base station, the switching information comprising an indication to switch from a first feedback scheme to a second feedback scheme.

The number of code blocks in each group may be equal or the number of code blocks in each group may differ by 1.

m-r code block groups may comprise L number of code blocks and r code block groups may comprise L+1 code blocks, wherein m is the number of acknowledgment bits, L is the floor to the quotient of the number of the plurality of code blocks and the number of acknowledgement bits and r is the remainder.

The apparatus may comprise means for, if the transmitted acknowledgement bit is a negative acknowledgement, receiving a retransmission of the code blocks of the code block group.

In a fourth aspect there is provided an apparatus, said apparatus comprising means for receiving an acknowledgment bit from a user equipment for at least one code block group of at least one transmit block, the at least one transmit block comprising a plurality of code blocks, wherein each of the plurality of code blocks is allocated to a respective code block group based on the number of acknowledgment bits allocated to the at least one transmit block and the number of the plurality of code blocks.

The apparatus may comprise means for providing first information to the user equipment, said first information comprising an indication of the number of acknowledgment bits allocated to a feedback instance, the feedback instance comprising at least one process including the at least one transmit block.

The apparatus may comprise means for providing switching information to the user equipment, the switching information comprising an indication to switch from a feedback scheme to a second feedback scheme.

The number of code blocks in each group may be equal or the number of code blocks in each group may differ by 1.

m-r code block groups may comprise L number of code blocks and r code block groups may comprise L+1 code blocks, wherein m is the number of acknowledgment bits, L is the floor to the quotient of the number of the plurality of code blocks and the number of acknowledgement bits and r is the remainder.

The apparatus may comprise means for, if the received acknowledgement bit is a negative acknowledgement, providing a retransmission of the code blocks of the code block group.

In a fifth aspect, there is provided an apparatus comprising at least one processor and at least one memory including a computer program code, the at least one memory and the computer program code configured to, with the at least one processor, cause the apparatus at least to determine a number of acknowledgment bits allocated to at least one transmit block, the at least one transmit block comprising a plurality of code blocks, allocate each of the plurality of code blocks to a respective code block group, based on the number of acknowledgment bits allocated to the at least one transmit block and the number of the plurality of code blocks, wherein each code block group is associated with one of the number of acknowledgment bits and cause transmission of the acknowledgment bit associated with each respective code block group based on a determined acknowledgement result for the respective code block group.

The apparatus may be configured to determine the number of acknowledgement bits allocated to a feedback instance, the feedback instance comprising at least one process including the at least one transmit block and allocate the acknowledgement bits to the at least one process based on transmit block size.

The apparatus may be configured to determine the number of acknowledgement bits allocated to a process, the process including the at least one transmit block and allocate the acknowledgement bits to the at least one transmit block based on transmit block size.

The apparatus may be configured to, if the feedback instance includes a plurality of processes or the at least one process includes a plurality of transmit blocks, determine a transmit block size ratio between the processes or between the transmit blocks and allocate the acknowledgement bits based on an acknowledgement bit ratio closest to the transmit block ratio.

The apparatus may be configured to determine the transmit block size based on transmission parameters.

The transmission parameters may comprise at least one of modulation coding scheme and physical resource block number.

The apparatus may be configured to receive first information from a base station, said first information comprising an indication of the number of acknowledgment bits allocated to the feedback instance.

The apparatus may be configured to receive switching information from the base station, the switching information comprising an indication to switch from a first feedback scheme to a second feedback scheme.

The number of code blocks in each group may be equal or the number of code blocks in each group may differ by 1.

m-r code block groups may comprise L number of code blocks and r code block groups may comprise L+1 code blocks, wherein m is the number of acknowledgment bits, L is the floor to the quotient of the number of the plurality of code blocks and the number of acknowledgement bits and r is the remainder.

The apparatus may be configured to, if the transmitted acknowledgement bit is a negative acknowledgement, receive a retransmission of the code blocks of the code block group.

In a sixth aspect there is provided an apparatus comprising at least one processor and at least one memory including a computer program code, the at least one memory and the computer program code configured to, with the at least one processor, cause the apparatus at least to receive an acknowledgment bit from a user equipment for at least one code block group of at least one transmit block, the at least one transmit block comprising a plurality of code blocks, wherein each of the plurality of code blocks is allocated to a respective code block group based on the number of acknowledgment bits allocated to the at least one transmit block and the number of the plurality of code blocks.

The apparatus may be configured to provide first information to the user equipment, said first information comprising an indication of the number of acknowledgment bits allocated to a feedback instance, the feedback instance comprising at least one process including the at least one transmit block.

The apparatus may be configured to provide switching information to the user equipment, the switching information comprising an indication to switch from a feedback scheme to a second feedback scheme.

The number of code blocks in each group may be equal or the number of code blocks in each group may differ by 1.

m-r code block groups may comprise L number of code blocks and r code block groups may comprise L+1 code blocks, wherein m is the number of acknowledgment bits, L is the floor to the quotient of the number of the plurality of code blocks and the number of acknowledgement bits and r is the remainder.

The apparatus may be configured to, if the received acknowledgement bit is a negative acknowledgement, provide a retransmission of the code blocks of the code block group.

In a seventh aspect, there is provided a computer program embodied on a non-transitory computer-readable storage medium, the computer program comprising program code for controlling a process to execute a process, the process comprising determining a number of acknowledgment bits allocated to at least one transmit block, the at least one transmit block comprising a plurality of code blocks, allocating each of the plurality of code blocks to a respective code block group, based on the number of acknowledgment bits allocated to the at least one transmit block and the number of the plurality of code blocks, wherein each code block group is associated with one of the number of acknowledgment bits and causing transmission of the acknowledgment bit associated with each respective code block group based on a determined acknowledgement result for the respective code block group.

The process may comprise determining the number of acknowledgement bits allocated to a feedback instance, the feedback instance comprising at least one process including the at least one transmit block and allocating the acknowledgement bits to the at least one process based on transmit block size.

The process may comprise determining the number of acknowledgement bits allocated to a process, the process including the at least one transmit block and allocating the acknowledgement bits to the at least one transmit block based on transmit block size.

If the feedback instance includes a plurality of processes or the at least one process includes a plurality of transmit blocks, allocating the acknowledgment bits to the processes or transmit blocks, respectively, based on transmit block size may comprise determining a transmit block size ratio between the processes or between the transmit blocks and allocating the acknowledgement bits based on an acknowledgement bit ratio closest to the transmit block ratio.

The process may comprise determining the transmit block size based on transmission parameters.

The transmission parameters may comprise at least one of modulation coding scheme and physical resource block number.

The process may comprise receiving first information from a base station, said first information comprising an indication of the number of acknowledgment bits allocated to the feedback instance.

The process may comprise receiving switching information from the base station, the switching information comprising an indication to switch from a first feedback scheme to a second feedback scheme.

The number of code blocks in each group may be equal or the number of code blocks in each group may differ by 1.

m-r code block groups may comprise L number of code blocks and r code block groups may comprise L+1 code blocks, wherein m is the number of acknowledgment bits, L is the floor to the quotient of the number of the plurality of code blocks and the number of acknowledgement bits and r is the remainder.

The process may comprise, if the transmitted acknowledgement bit is a negative acknowledgement, receiving a retransmission of the code blocks of the code block group.

In an eighth aspect, there is provided a computer program embodied on a non-transitory computer-readable storage medium, the computer program comprising program code for controlling a process to execute a process, the process comprising receiving an acknowledgment bit from a user equipment for at least one code block group of at least one transmit block, the at least one transmit block comprising a plurality of code blocks, wherein each of the plurality of code blocks is allocated to a respective code block group based on the number of acknowledgment bits allocated to the at least one transmit block and the number of the plurality of code blocks.

The process may comprise providing first information to the user equipment, said first information comprising an indication of the number of acknowledgment bits allocated to a feedback instance, the feedback instance comprising at least one process including the at least one transmit block.

The process may comprise providing switching information to the user equipment, the switching information comprising an indication to switch from a feedback scheme to a second feedback scheme.

The number of code blocks in each group may be equal or the number of code blocks in each group may differ by 1.

m-r code block groups may comprise L number of code blocks and r code block groups may comprise L+1 code blocks, wherein m is the number of acknowledgment bits, L is the floor to the quotient of the number of the plurality of code blocks and the number of acknowledgement bits and r is the remainder.

The process may comprise, if the received acknowledgement bit is a negative acknowledgement, providing a retransmission of the code blocks of the code block group.

In a ninth aspect there is provided a computer program product for a computer, comprising software code portions for performing the steps the method of the first and second aspect when said product is run on the computer.

A device for a communication system may comprise the apparatus according to the above aspects.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which:

FIG. 4 shows a flowchart of an example method according to some embodiments;

FIG. 5 shows a flowchart of an example method according to some embodiments;

FIG. 7 shows a schematic illustration of an example ACK/NACK feedback scheme across transport block (TB) or process;

FIG. 8 shows a schematic illustration of feedback switching according to some embodiments;

DETAILED DESCRIPTION

Before explaining in detail the examples, certain general principles of a wireless communication system and mobile communication devices are briefly explained with reference to FIGS. 1 to 2 to assist in understanding the technology underlying the described examples.

Figure 1:
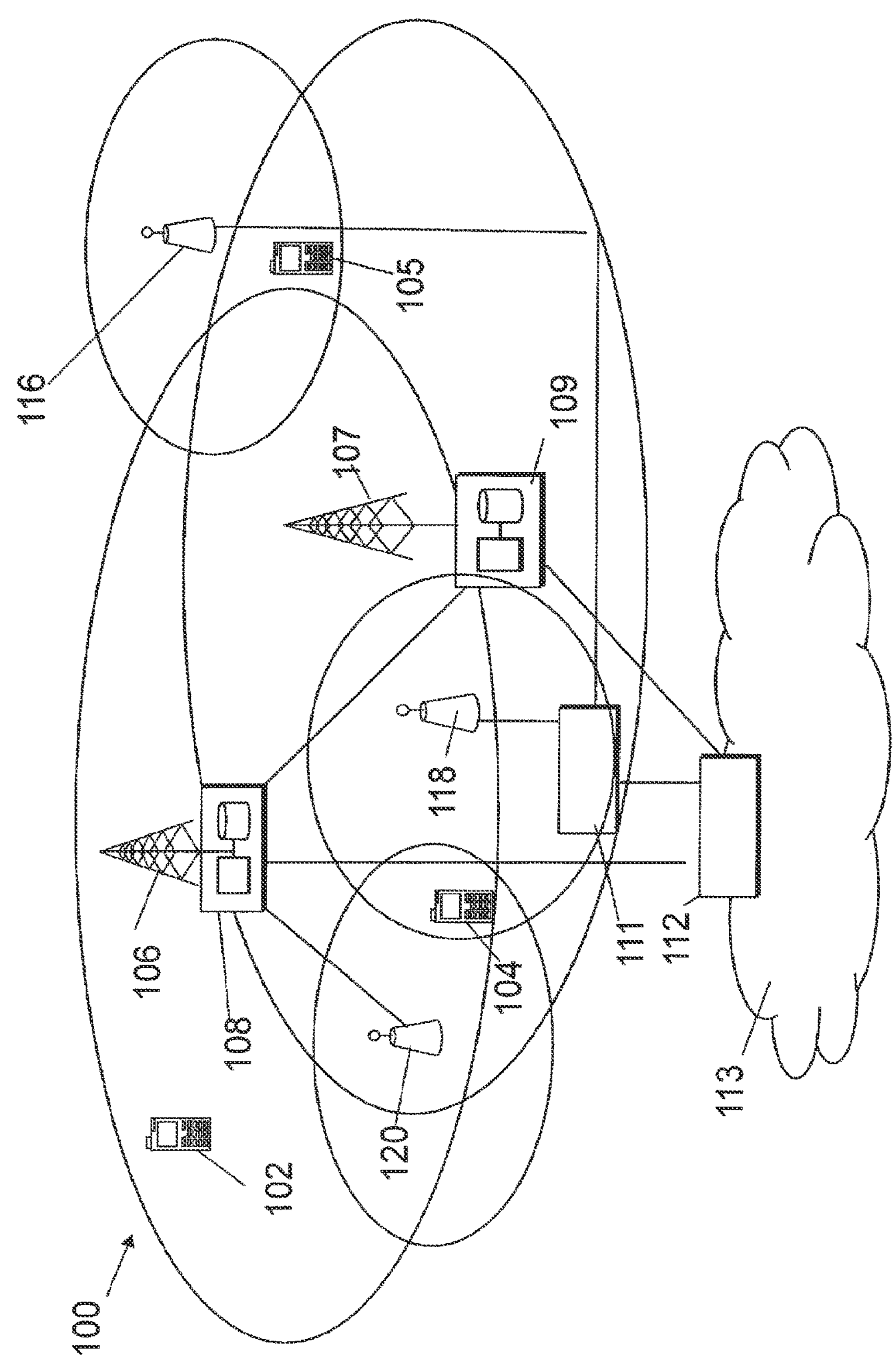
FIG. 1 shows a schematic diagram of an example communication system comprising a base station and a plurality of communication devices.

In a wireless communication system 100, such as that shown in FIG. 1, mobile communication devices or user equipment (UE) 102, 104, 105 are provided wireless access via at least one base station or similar wireless transmitting and/or receiving node or point. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity such as a Radio Network Controller (RNC). In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

Figure 2:
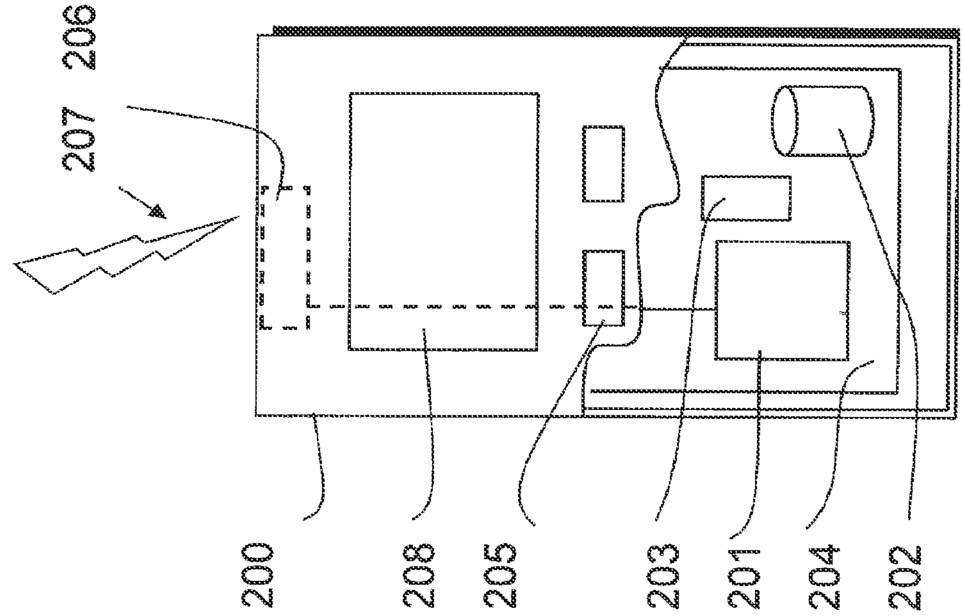
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, video, electronic mail (email), text message, multimedia and so on. Users may thus be offered and provided numerous services via their communication devices and there may be one or more applications running in the MS requiring data transmission between the MS and the network. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, gaming, various alerts and other information.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

Hybrid Automatic Repeat Request (HARQ) techniques may be used to provide reliability requirements in wireless communication systems.

Existing wireless standards (e.g., LTE, etc. . . . ) use HARQ by sending feedback per each transmit block (TB) received at the receiver. In the context of LTE, ACK/NACK feedback is sent per TB and 1 to 2 bits are used to indicate whether the received TB(s) is in error or not. The ACK/NACK feedback bits are transmitted with uplink control information (UCI) for format 1a/1b. In the case of carrier aggregation, more feedback bits are used in ACK/NACK for multiple carriers and transmitted on the primary component carrier (PCC). In particular, ACK/NACK may use UCI format 3 or format 1b with channel selection.

In a 5G system, high data rate transmissions are expected. Large bandwidth and efficient transmission schemes may be used in 5G systems, resulting in a significant increase in data rates, especially for the enhanced mobile broadband (eMBB) scenario. The high data rate requirement of 5G may increase the size of the TB. Thus, the size of transmit block will become larger for longer packet transmissions.

The existing LTE feedback mechanism may lead to performance degradation when the TB is large. When the TB is large, the retransmission overhead may be large even if transmission errors only exist in part of a packet, if the same feedback scheme is used as in LTE. Reducing retransmission overhead while satisfying the reliability of the transmission may be desirable. Finer ACK/NACK feedback may improve system transmit efficiency, especially for large packet transmission.

To guarantee coding/decoding complexity and reduce delay, one TB is segmented into multiple code blocks (CB). At least one CB in error leads the whole TB to be considered as in error. It may be desirable to provide the ACK/NACK feedback at the CB level.

Low density parity check (LDPC) may be used for channel coding due to its good performance and low implementation complexity. For example, LDPC may be used to support the eMBB scenario in 5G systems. LDPC has implicit error detection ability and CB errors in LDPC may be implicitly detected without Cycling Redundancy Check (CRC). Thus, a LDPC coding scheme may support finer ACK/NACK feedback.

It is likely that the maximum code block size (CBS) will remain in the range of 6000-8000 bits and small CBS may be realized by using lifting with small expansion factor. Therefore, the granularity of feedback unit could be finer even for medium or small packet.

Available resources for feedback may also increase with the use of large bandwidths. That is, in 5G systems, where high bandwidths are used, the available resources for feedback may be higher compared to previous systems. When beamforming technique is used to improve coverage, the capacity of uplink control channel can be increased, especially for the users with strong link. Therefore, it may be possible to justify a larger ACK/NACK bit number from the view of transmission capability. However, techniques to optimize the feedback mechanism are desirable.

In 5G systems, different services may be used by the UE at a given time. In particular, scheduling feedback for different services that carry feedback bits on multiple HARQ processes may be facilitated in the same time interval.

Figure 3:
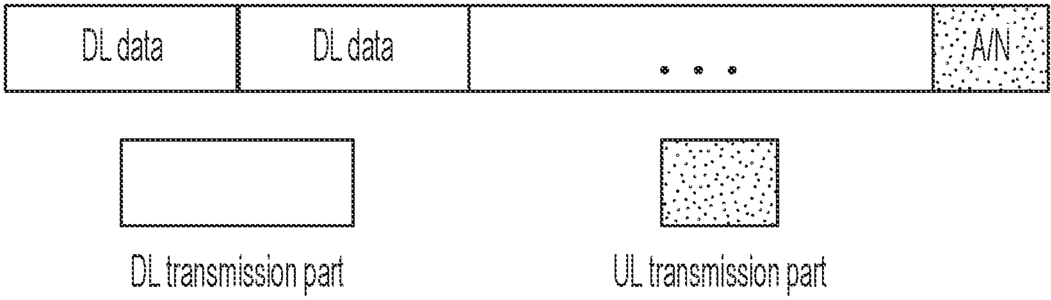
FIG. 3 shows a schematic diagram of a downlink (DL) Hybrid Automatic Repeat Request (HARQ) process

One example scenario is shown in FIG. 3, where downlink (DL) transmissions during multiple time intervals are acknowledged by using uplink (UL) of one time interval. More ACK/NACK feedback bits should be carried in that uplink time interval. Therefore, an optimized feedback scheme to utilize the resources allocated for UL feedback is considered.

For a MIMO system, multiple layer transmission is used to increase the transmission rate. The link quality is different for different layers/transmit blocks. In LTE system, the simple scheme is adopted, in which the same ACK/NACK feedback overhead is allocated for each TB. The LTE scheme may not be an optimized scheme on account of different size for each TB.

In the following, an enhanced ACK/NACK feedback scheme is proposed to reduce the retransmission overhead.

FIG. 4 shows a flowchart of a method according to some embodiments. In a first step, S1, the method comprises determining a number of acknowledgment bits allocated to at least one transmit block, the at least one transmit block comprising a plurality of code blocks.

In a second step, S2, the method comprises allocating each of the plurality of code blocks to a respective code block group, based on the number of acknowledgment bits allocated to the at least one transmit block and the number of the plurality of code blocks, wherein each code block group is associated with one of the number of acknowledgment bits.

In a third step, S3, the method comprises causing transmission of the acknowledgment bit associated with each respective code block group based on a determined acknowledgement result for the respective code block group.

A method such as that of FIG. 4 maybe performed by a user equipment, or an apparatus associated with a user equipment. The acknowledgement bits may be transmitted to a base station. However, although the method has been described with respect to downlink (DL), it would also be suitable for use in uplink (UL).

FIG. 5 shows a flowchart of a method according to some embodiments. In a first step, T1, the method comprises receiving an acknowledgment bit from a user equipment for at least one code block group of at least one transmit block, the at least one transmit block comprising a plurality of code blocks, wherein each of the plurality of code blocks is allocated to a respective code block group based on the number of acknowledgment bits allocated to the at least one transmit block and the number of the plurality of code blocks.

A method such as that of FIG. 5 maybe performed by a base station and/or network node or an apparatus associated with a base station and/or network node.

The acknowledgment bits may be referred to as ACK/NACK feedback bits.

A method such as that shown in FIGS. 4 and 5 may provide a more efficient ACK/NACK feedback scheme, for example, for a large packet transmission. The method may improve transmission efficiency by reducing retransmission overhead. ACK/NACK are provided with finer granularity at CB group level and/or may fully exploit all the ACK/NACK feedback bits.

The number of ACK/NACK bits allocated to a TB may be based on TB size, the number of TB, and/or the number of processes in a feedback instance.

To balance uplink control signalling overhead and downlink throughput gain, the ACK/NACK feedback schemes with different ACK/NACK bit number may be switched.

In the following, the proposed ACK/NACK feedback schemes and switching between feedback schemes are explained in more detail.

In the following example, a case with ACK/NACK feedback for one HARQ process is explained. The method may be extended to other cases with ACK/NACK feedback for multiple HARQ processes. One feedback instance may comprise one or multiple HARQ processes.

A UE may receive information from a base station, the information comprising an indication of the total number of acknowledgement bits, ACK/NACK feedback bits, for a feedback instance. A feedback instance comprises at least one process including at least one transmit block Determining the number of acknowledgment bits allocated to a transmit block may comprise determining the number of acknowledgement bits allocated to a feedback instance, the feedback instance comprising at least one process including the at least one transmit block and allocating the acknowledgement bits to the at least one process based on the TBS.

Determining the number of acknowledgment bits allocated to a TB may comprise determining the number of acknowledgement bits allocated to a process, the process including the at least one transmit block and allocating the acknowledgement bits to the at least one process based on transmit block size. Assuming a UE knows the total number of ACK/NACK feedback bits and uplink resources for ACK/NACK transmission, the UE may determine the ACK/NACK bit number for each TB based on total ACK/NACK bit number and TBS for each TB.

If the feedback instance includes a plurality of processes or the at least one process includes a plurality of transmit blocks, allocating the acknowledgment bits to the processes or transmit blocks, respectively, based on transmit block size may comprise determining a transmit block size ratio between the processes or between the transmit blocks and allocating the acknowledgement bits based on an acknowledgement bit ratio closest to the transmit block ratio.

For example, if the TB number is equal to 1, UE allocates all the ACK/NACK bits for this TB.

If the TB number is greater than 1, UE determines the ACK/NACK bit allocation for each TB. To do so, the UE determines the TBS ratio between different TBs, lists the possible ACK/NACK bit ratio between TBs with condition of integer ACK/NACK bit for each TB and selects the nearest ACK/NACK bit ratio relative to TBS ratio.

The corresponding integer numeral in ACK/NACK bit ratio is the ACK/NACK bit number for each TB.

The TBS may be determined based on transmission parameters, such as modulation coding scheme (MCS) and physical resource block (PRB) number.

The UE then makes a grouping for the CBs in each TB, that is allocates each of the plurality of CBs of a TB to a respective CB group, based on the CB number and ACK/NACK bit number for each TB. The total number of CB groups corresponds to the ACK/NACK bit number for the TB and each CB group is associated with an acknowledgement bit.

The number of CB in a group may be determined as follows. The quotient of CB number and ACK/NACK bit number (or the floor of the quotient, i.e. the largest previous integer to the quotient, if the quotient is not itself an integer) for this TB is denoted as L. The CB number in one CB group can be an integer near this quotient, e.g. L or L+1. The remainder of CB number and ACK/NACK bit number for this TB is denoted as r. The last r CB groups have the L+1 CBs. Other CB group(s) have L CBs. The same CB number is equivalent to same information bit because the same MCS is used for CBs in one TB. As a result, the number of CBs in each CB group may be equal, or the number of CBs in each CB group may differ by one.

For example, when the number of CBs in a given TB are N and available feedback bits for ACK/NACK is m, the grouping of the code blocks may be performed as follows, where the remainder, r=Modulo (N,m).

```
    For k = 1: m
    If k <= m − r
    Z = Floor(N/m)
  else
    Z = Floor(N/m) +1
  end
  end
```

For example, when N=60 and m=9, we get (6, 6, 6, 7, 7, 7, 7, 7, 7) as the CB groups.

The UE may then perform channel decoding for each CB and determine the ACK/NACK result for each CB.

The UE causes transmission of an acknowledgment associated with each respective code block group based on a determined acknowledgement result for each code block group.

The UE may determine the ACK/NACK results for each CB group by performing an AND operation between ACK/NACK results for the CBs in each CB group. If there is NACK in the group, NACK is the feedback result for the CB group. Otherwise, ACK is the feedback result for the CB group ACK/NACK results may be sorted according to first CB group index, then TB index, then process index. The ACK/NACK results may then be provided with the allocated uplink resource.

Figure 6:
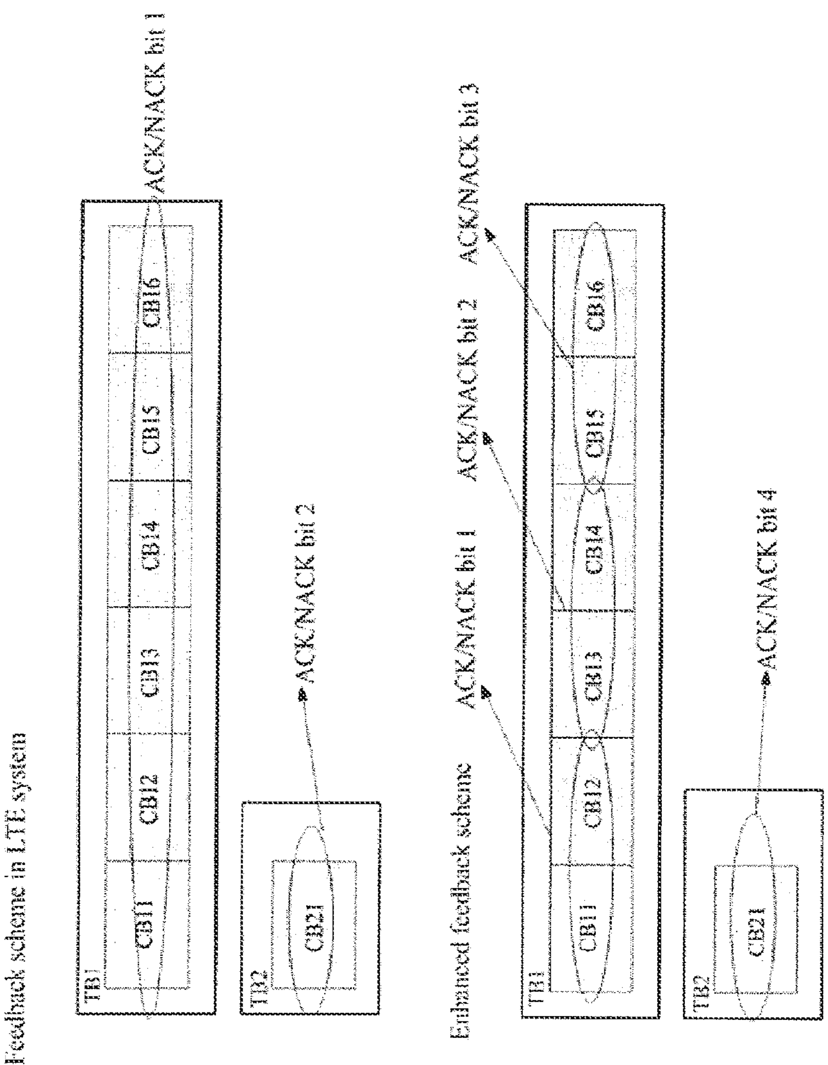
FIG. 6 shows schematic illustration of an example enhanced feedback scheme.

FIG. 6 illustrates one example. In this example, there are 2 TBs for transmission. Different MCS is used between TBs because of different channel quality. In detail, TB1 and TB2 includes 6 CBs and 1 CB respectively. In LTE system, 1 ACK/NACK feedback bit is used per TB. In the enhanced feedback scheme as described with respect to FIG. 4, there are 4 ACK/NACK feedback bits in total and so the UE determines there are 4 acknowledgement bits allocated to the TB. 3 ACK/NACK feedback bits are used for TB1 and 1 ACK/NACK bit is used for TB2, based on TBS ratio.

For an LTE system, the BLER (including 6 CBs) may be 0.1 with suitable MCS according to link adaptation. If the same MCS is used for the enhanced scheme, the BLER (including 2 CBs) for CB group in TB1 is 0.0345 if the error distribution is assumed the same for 3 CB groups on account of independent coding for each CB. Roughly, 6.55% overhead in the first TB may be avoided for retransmission by the proposed finer feedback scheme. With the CBs grouped as discussed, the ACK/NACK bit allocation for TBs is optimized based on link quality and the retransmission redundancy may be reduced further.

In high layer, the resource allocation and data processing is based on TB. The joint ACK/NACK feedback for CBs in different TBs may increase processing complexity for high layer. Also, the independence of transmission for two TBs is impacted. For example, the round trip time for two TBs will be correlated.

Thus, it is preferred that the CBs in different TBs are fed back with different ACK/NACK bits. For different HARQ process, the processing can be made independently to reduce hardware realization complexity and process time. Thus, it is preferred that the CBs in different process are fed back with different ACK/NACK bits. FIG. 7 illustrates an example to explain the grouping scheme from CB to CB group in case of cross TB or process. From view of hardware realization requirement and impact on high layer processing, option 1 is preferred. In other words, the CBs in different TBs or process are preferred to make separate ACK/NACK feedback.

Based on candidate channel coding scheme for 5G, the minimum ACK/NACK feedback granularity is at CB level. The number of CB is related with TBS, which is determined by MCS level and number of PRB. If TBS is small, for example TBS with less than 10PRB in LTE system, the number of CB is one, there is no need to increase the ACK/NACK bit number to reduce redundancy of retransmission.

When TBS is larger, more feedback bits may be used for feedback with more CB groups.

An eNB may have the flexibility to balance ACK/NACK feedback overload and downlink performance gain according to actual network situation. On account of dynamic change of channel quality and traffic/service, it may be desirable to dynamically switch the feedback schemes, including LTE ACK/NACK feedback scheme and proposed enhanced ACK/NACK feedback scheme. A method may comprise receiving switching information from the base station, the switching information comprising an indication to switch from a first feedback scheme to a second feedback scheme.

The first feedback scheme may be the LTE ACK/NACK feedback scheme and the second feedback scheme may be the enhanced ACK/NACK feedback scheme. Alternatively, or in addition, the two feedback schemes may both be the enhanced feedback scheme with differing bit number.

The information may comprise an indication of the ACK/NACK feedback scheme or ACK/NACK bit number. If the enhanced ACK/NACK transmission scheme is used, eNB may indicate the uplink resource for ACK/NACK transmission.

FIG. 8 illustrates one example for feedback scheme switching. The feedback schemes with 2/3/4 ACK/NACK feedback bits (as shown in Feedback schemes 1, 2 and 3, respectively) may be switched to achieve good balance between uplink feedback overhead and downlink performance gain. When 2 bits ACK/NACK feedback are used, as shown feedback scheme 1, the proposed scheme naturally falls back to LTE feedback scheme.

Figure 9:
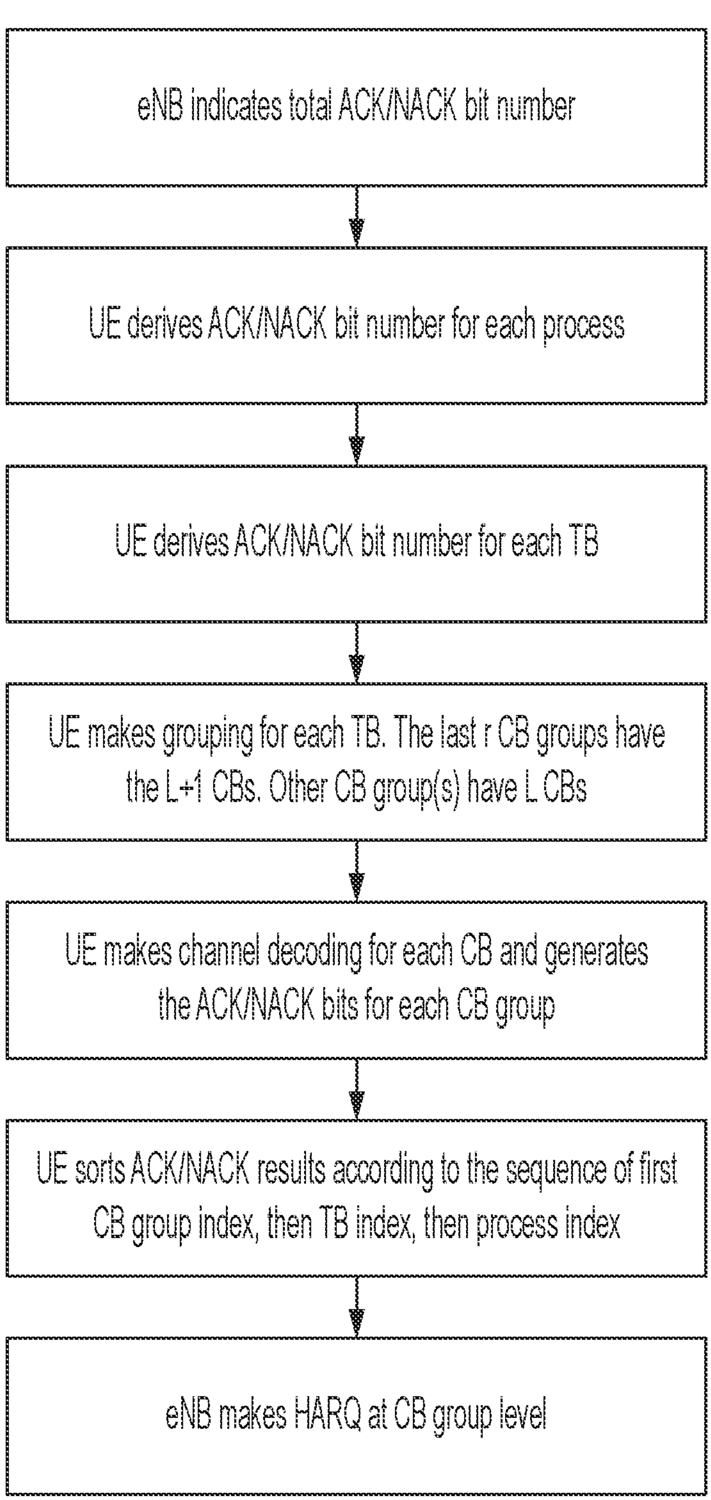
FIG. 9 shows a flowchart of an example implementation of a method according to embodiments.

FIG. 9 shows a flowchart of an example process according to embodiments.

In a first step, eNB indicates total ACK/NACK bit number and ACK/NACK transmission resources for example by providing physical downlink control channel (PDCCH) to indicate physical downlink shared channel (PDSCH) transmission parameters, such as MCS, resource location and process number, etc.

In a second step, according to total ACK/NACK feedback bit number, UE derives ACK/NACK bit number for each process. If the process number is larger than 1, the UE may determine the TBS ratio between two processes by MCS and PRB number from PDCCH. The possible bit ratio for processes are listed. For example, the possible bit ratio is 3/1, 2/2, 1/3 between two processes for total 4 ACK/NACK bits. The UE may then determine the nearest bit ratio relative to TBS ratio and derived the corresponding bit number for each process.

If the process number is 1, the total ACK/NACK bit number is used for this process In a third step, according to ACK/NACK feedback bit number for each process, UE may derive the ACK/NACK bit number for each TB as in step 2.

In a fourth step, the UE then determines the CB grouping for each TB according to its allocated ACK/NACK bit number in step 3. Each group has either the same CB number or the number of CBs in a group differs by 1. That is, the quotient and remainder of CB number and ACK/NACK bit number for the TB is denoted as L and r respectively. The last r CB groups have the L+1 CBs. Other CB group(s) have L CBs.

In a fifth step, the UE performs channel decoding for each CB and generates the ACK/NACK bits for each CB group.

The UE then performs an AND operation for ACK/NACK bits in each CB group i. If there is NACK in the group, NACK is the feedback result for the group ii. Otherwise, ACK is the feedback result for the group The UE sorts ACK/NACK results according to the sequence of first CB group index, then TB index, then process index. They are provided to the eNB with indicated uplink transmission resource.

The eNB may then provide HARQ at CB group level.

On account of trade-off between ACK/NACK feedback overhead and downlink performance gain, the total ACK/NACK bit number may be limited to no more than 4, which is twice compared to the LTE ACK/NACK feedback overhead. Then eNB uses 2 bit dynamic signalling to indicate the total ACK/NACK bit number. Another alternative is eNB configure a semi-static bit number, e.g. X, for proposed enhanced ACK/NACK feedback scheme. Then eNB uses only 1 bit dynamic signalling to indicate switching between LTE feedback scheme and the proposed ACK/NACK feedback scheme. For the ACK/NACK transmission resource, additional resource can be configured for UEs. Similar scheme can be used as specified in LTE carrier aggregation case.

The BS uses the same CB grouping scheme to obtain the link relation between ACK/NACK bit and PDSCH.

Although the proposed scheme is described from the view of downlink, it can be also used for uplink.

The proposed enhanced ACK/NACK scheme may reduce the retransmission redundancy and increase system throughput.

It should be understood that each block of the flowchart of FIGS. 3 and 4 and any combination thereof may be implemented by various means or their combinations, such as hardware, software, firmware, one or more processors and/or circuitry.

Figure 10:
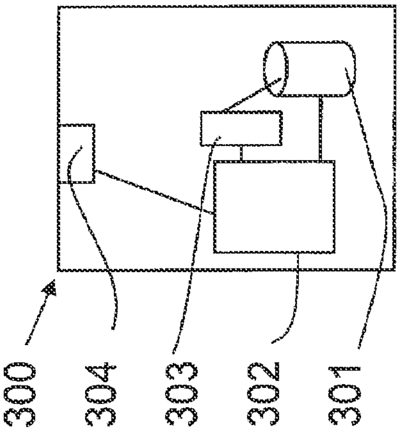
FIG. 10 shows a schematic diagram of an example control apparatus.

The method may be implemented in entities on a mobile device as described with respect to FIG. 2 or control apparatus as shown in FIG. 10. FIG. 10 shows an example of a control apparatus for a communication system, for example to be coupled to and/or for controlling a station of an access system, such as a RAN node, e.g. a base station, (e)node B or 5G AP, or a node of a core network such as an MME or S-GW, or a server or host. The method may be implanted in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head. For example the control apparatus 300 can be configured to execute an appropriate software code to provide the control functions. Control functions may comprise determining a number of acknowledgment bits allocated to at least one transmit block, the at least one transmit block comprising a plurality of code blocks, allocating each of the plurality of code blocks to a respective code block group, based on the number of acknowledgment bits allocated to the at least one transmit block and the number of the plurality of code blocks, wherein each code block group is associated with one of the number of acknowledgment bits and causing transmission of the acknowledgment bit associated with each respective code block group based on a determined acknowledgement result for the respective code block group.

Alternatively, or in addition, control functions may comprise receiving an acknowledgment bit from a user equipment for at least one code block group of at least one transmit block, the at least one transmit block comprising a plurality of code blocks, wherein each of the plurality of code blocks is allocated to a respective code block group based on the number of acknowledgment bits allocated to the at least one transmit block and the number of the plurality of code blocks.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to 5G networks, similar principles can be applied in relation to other networks and communication systems, for example, other implementations new radio networks, or MIMO systems in LTE networks. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

What is claimed is:

1. A method comprising:

determining a total number of acknowledgment bits allocated to at least one transmit block, the at least one transmit block comprising a plurality of code blocks;

determining a number of code block groups allocated to at least one transmit block based on the total number of acknowledgment bits allocated to the at least one transmit block and the number of the plurality of code blocks, wherein each code block group is associated with one acknowledgment bit, and wherein the number of code block groups corresponds to the number of acknowledgment bits allocated to the transmit block;

allocating each of the plurality of code blocks to a respective code block group, wherein m−r code block groups comprise L number of code blocks and r code block groups have L+1 code blocks, wherein m is the number of code block groups, L is the floor to the quotient of the number of the plurality of code blocks and the number of code block groups, and r is the remainder; and causing transmission of the acknowledgment bit associated with each respective code block group based on a determined acknowledgement result for the respective code block group.

2. A method according to claim 1, wherein determining the number of acknowledgment bits allocated to the at least one transmit block comprises:

determining the number of acknowledgement bits allocated to a feedback instance, the feedback instance comprising at least one hybrid automatic repeat request process including the at least one transmit block; and allocating the acknowledgement bits to the at least one hybrid automatic repeat request process based on transmit block size.

3. A method according to claim 2, wherein, if the feedback instance includes a plurality of hybrid automatic repeat request processes or the at least one hybrid automatic repeat request process includes a plurality of transmit blocks, allocating the acknowledgment bits to the hybrid automatic repeat request processes or transmit blocks, respectively, based on transmit block size comprises:

determining a transmit block size ratio between the hybrid automatic repeat request processes or between the transmit blocks; and allocating the acknowledgement bits based on an acknowledgement bit ratio closest to the transmit block ratio.

4. A method according to claim 2, comprising receiving first information from a base station, said first information comprising an indication of the number of acknowledgment bits allocated to the feedback instance.

5. A method according to claim 1, wherein determining the number of acknowledgment bits allocated to the at least one transmit block comprises:

determining the number of acknowledgement bits allocated to a hybrid automatic repeat request process, the hybrid automatic repeat request process including the at least one transmit block; and allocating the acknowledgement bits to the at least one transmit block based on transmit block size.

6. A method according to claim 5, comprising determining the transmit block size based on transmission parameters.

7. A method according to claim 6, wherein the transmission parameters comprise at least one of modulation coding scheme and physical resource block number.

8. A method according to claim 1, comprising receiving switching information from the base station, the switching information comprising an indication to switch from a first feedback scheme to a second feedback scheme.

9. A method according to claim 1, wherein the number of code blocks in each group is equal.

10. A method according to claim 1, wherein if the transmitted acknowledgement bit is a negative acknowledgement;

receiving a retransmission of the code blocks of the code block group.

11. A method comprising:

receiving an acknowledgment bit from a user equipment for at least one code block group of at least one transmit block, the at least one transmit block comprising a plurality of code blocks, wherein each of the plurality of code blocks is allocated to a respective code block group based on a total number of acknowledgment bits allocated to the at least one transmit block and the number of the plurality of code blocks, wherein each code block group is associated with one acknowledgment bit, and wherein the number of code block groups corresponds to the number of acknowledgment bits allocated to the transmit block, wherein m−r code block groups comprise L number of code blocks and r code block groups have L+1 code blocks, wherein m is the number of code block groups, L is the floor to the quotient of the number of the plurality of code blocks and the number of acknowledgement bits and r is the remainder.

12. A method according to claim 11, comprising providing first information to the user equipment, said first information comprising an indication of the number of acknowledgment bits allocated to a feedback instance, the feedback instance comprising at least one hybrid automatic repeat request process including the at least one transmit block.

13. A method according to claim 11, comprising providing switching information to the user equipment, the switching information comprising an indication to switch from a feedback scheme to a second feedback scheme.

14. A method according to claim 11, wherein the number of code blocks in each group is equal.

15. A method according to claim 11, wherein if the received acknowledgement bit is a negative acknowledgement;

providing a retransmission of the code blocks of the code block group.

16. A non-transitory computer readable medium comprising program instructions for causing an apparatus to perform at least the following:

determining a number of acknowledgment bits allocated to at least one transmit block, the at least one transmit block comprising a plurality of code blocks;

determining a number of code block groups allocated to at least one transmit block based on the number of acknowledgment bits allocated to the at least one transmit block and the number of the plurality of code blocks, wherein each code block group is associated with one acknowledgment bit, and wherein the number of code block groups corresponds to the number of acknowledgment bits allocated to the transmit block;

allocating each of the plurality of code blocks to a respective code block group, wherein m−r code block groups comprise L number of code blocks and r code block groups have L+1 code blocks, wherein m is the number of code block groups, L is the floor to the quotient of the number of the plurality of code blocks and the number of code block groups, and r is the remainder; and causing transmission of the acknowledgment bit associated with each respective code block group based on a determined acknowledgement result for the respective code block group.

17. An apparatus comprising:

at least one processor and at least one memory including a computer program code, the at least one memory and the computer program code configured to, with the at least one processor, cause the apparatus at least to:

determine a number of acknowledgment bits allocated to at least one transmit block, the at least one transmit block comprising a plurality of code blocks;

determine a number of code block groups allocated to at least one transmit block based on the number of acknowledgment bits allocated to the at least one transmit block and the number of the plurality of code blocks, wherein each code block group is associated with one acknowledgment bit, and wherein the number of code block groups corresponds to the number of acknowledgment bits allocated to the transmit block; and allocate each of the plurality of code blocks to a respective code block group, wherein m−r code block groups comprise L number of code blocks and r code block groups have L+1 code blocks, wherein m is the number of code block groups, L is the floor to the quotient of the number of the plurality of code blocks and the number of code block groups, and r is the remainder; and cause transmission of the acknowledgment bit associated with each respective code block group based on a determined acknowledgement result for the respective code block group.

18. An apparatus comprising:

at least one processor and at least one memory including a computer program code, the at least one memory and the computer program code configured to, with the at least one processor, cause the apparatus at least to:

receive an acknowledgment bit from a user equipment for at least one code block group of at least one transmit block, the at least one transmit block comprising a plurality of code blocks, wherein each of the plurality of code blocks is allocated to a respective code block group based on a total number of acknowledgment bits allocated to the at least one transmit block and the number of the plurality of code blocks, wherein each code block group is associated with one acknowledgment bit, and wherein the number of code block groups corresponds to the number of acknowledgment bits allocated to the transmit block, wherein m−r code block groups comprise L number of code blocks and r code block groups have L+1 code blocks, wherein m is the number of code block groups, L is the floor to the quotient of the number of the plurality of code blocks and the number of acknowledgement bits and r is the remainder.

19. A non-transitory computer readable medium comprising program instructions for causing an apparatus to perform at least the following:

receiving an acknowledgment bit from a user equipment for at least one code block group of at least one transmit block, the at least one transmit block comprising a plurality of code blocks, wherein each of the plurality of code blocks is allocated to a respective code block group based on a total number of acknowledgment bits allocated to the at least one transmit block and the number of the plurality of code blocks, wherein each code block group is associated with one acknowledgment bit, and wherein the number of code block groups corresponds to the number of acknowledgment bits allocated to the transmit block, wherein m−r code block groups comprise L number of code blocks and r code block groups have L+1 code blocks, wherein m is the number of code block groups, L is the floor to the quotient of the number of the plurality of code blocks, and r is the remainder.

* * * * *